United States Patent
Rudolph et al.

(10) Patent No.: US 11,838,353 B2
(45) Date of Patent: Dec. 5, 2023

(54) REMOTE ACCESS OF LOCAL FILE SYSTEM

(71) Applicant: ARRIS Enterprises LLC, Suwanee, GA (US)

(72) Inventors: Michael J. Rudolph, Naperville, IL (US); Michael P. Sullivan, Sugar Hill, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/584,929

(22) Filed: Jan. 26, 2022

(65) Prior Publication Data

US 2022/0239724 A1    Jul. 28, 2022

Related U.S. Application Data

(60) Provisional application No. 63/142,636, filed on Jan. 28, 2021.

(51) Int. Cl.
*H04N 5/765* (2006.01)
*H04N 7/10* (2006.01)
*H04L 12/66* (2006.01)
*H04L 67/06* (2022.01)
*H04N 21/61* (2011.01)

(52) U.S. Cl.
CPC .......... *H04L 67/06* (2013.01); *H04N 21/6118* (2013.01)

(58) Field of Classification Search
None
See application file for complete search history.

(56) References Cited

U.S. PATENT DOCUMENTS

| | | | |
|---|---|---|---|
| 2011/0010741 A1* | 1/2011 | Liao | H04N 21/47202 725/98 |
| 2013/0007217 A1* | 1/2013 | Jhang | H04L 69/03 709/219 |
| 2014/0282802 A1* | 9/2014 | Bowler | H04N 7/102 725/129 |
| 2020/0076469 A1* | 3/2020 | Ariesen | H04H 20/78 |

* cited by examiner

*Primary Examiner* — Nicholas R Taylor
*Assistant Examiner* — Ho T Shiu
(74) *Attorney, Agent, or Firm* — Chernoff, Vilhauer, McClung & Stenzel, LLP

(57) ABSTRACT

In one embodiment, a cable distribution system that includes a head end and a remote fiber node that converts received data to analog data suitable to be provided on a coaxial cable for a plurality of customer devices. At least one of the head end and the remote fiber node including a set of commands that traverse a local file system where less than all of the set of commands that traverse the local file system are available to neither of a command line interface nor a graphical user interface. Also, it is configured to access a remote file system based upon a command that includes a label identifying an Internet Protocol address to the remote file system to obtain a file therefrom.

16 Claims, 6 Drawing Sheets

APPLIANCE

VIEW A LIST OF FILES

VIEW A LIST OF FOLDERS

COPY A FILE

COPY A DIRECTORY

CREATE NEW FILE

CREATE NEW DIRECTORY

MOVE A FILE

MOVE A DIRECTORY

DELETE A FILE

DELETE A DIRECTORY

EXECUTE A FILE

COMMAND LINE INTERFACE

REMOTE ACCESS OF LOCAL FILE SYSTEM

CROSS REFERENCE TO RELATED APPLICATIONS

The application claims the benefit of U.S. Provisional Patent Application Ser. No. 63/142,636 filed Jan. 28, 2021.

BACKGROUND

The subject matter of this application relates to remote access of a local file system.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which:

FIG. 3 illustrates an applicable of a cable system.

DETAILED DESCRIPTION

Figure 1:
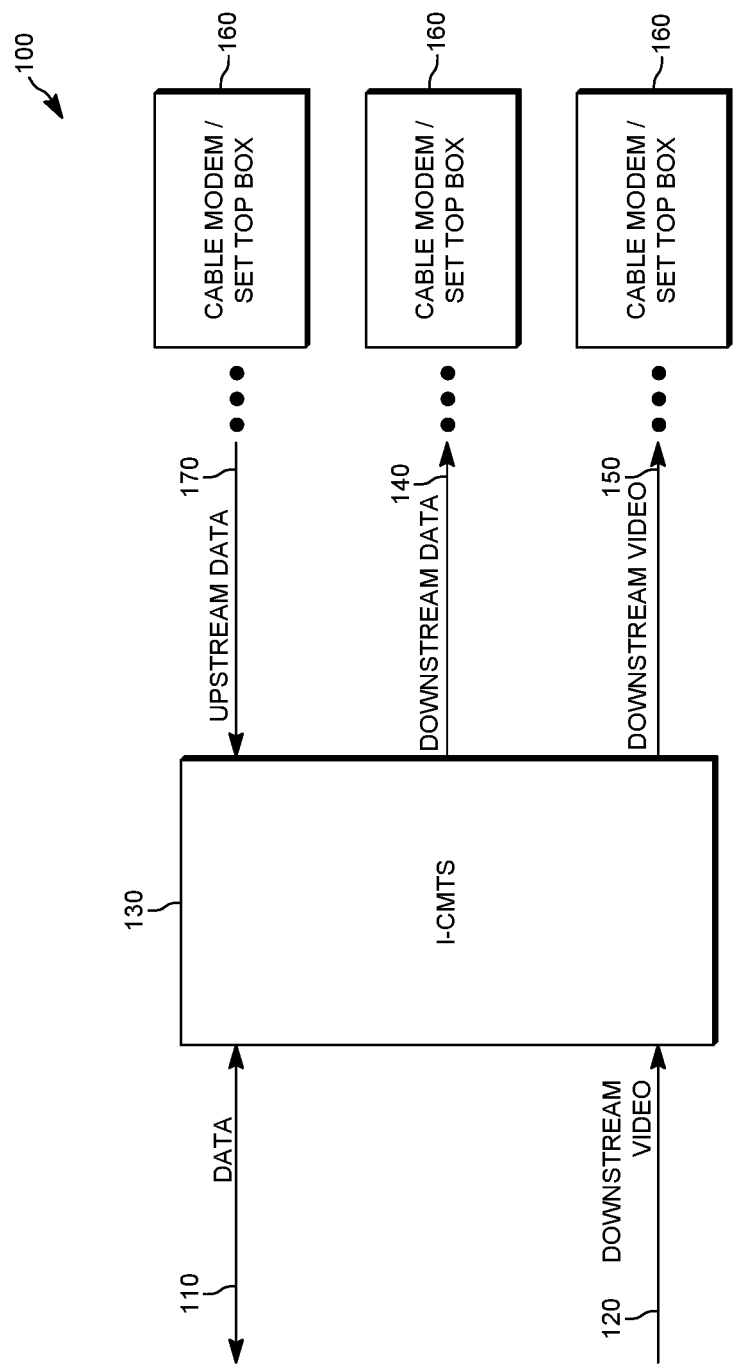
FIG. 1 illustrates an integrated Cable Modem Termination System a cable system.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
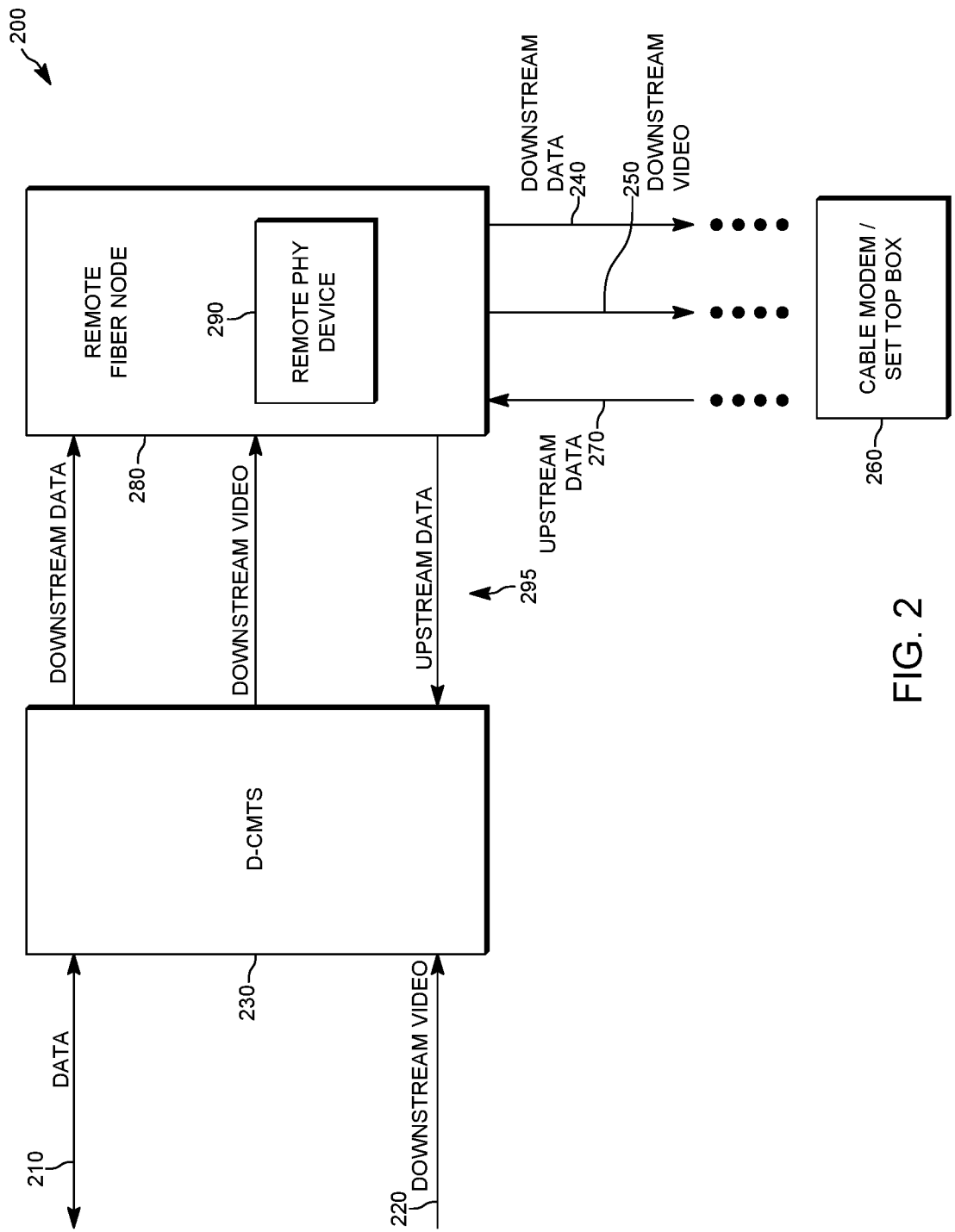
FIG. 2 illustrates a distributed Cable Modem Termination System a cable system.

Referring to FIG. 2, as a result of increasing bandwidth demands, limited facility space for integrated CMTSs, and power consumption considerations, some embodiments may include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end.

By way of example, the remote PHY (or MAC PHY) device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

Figure 6:
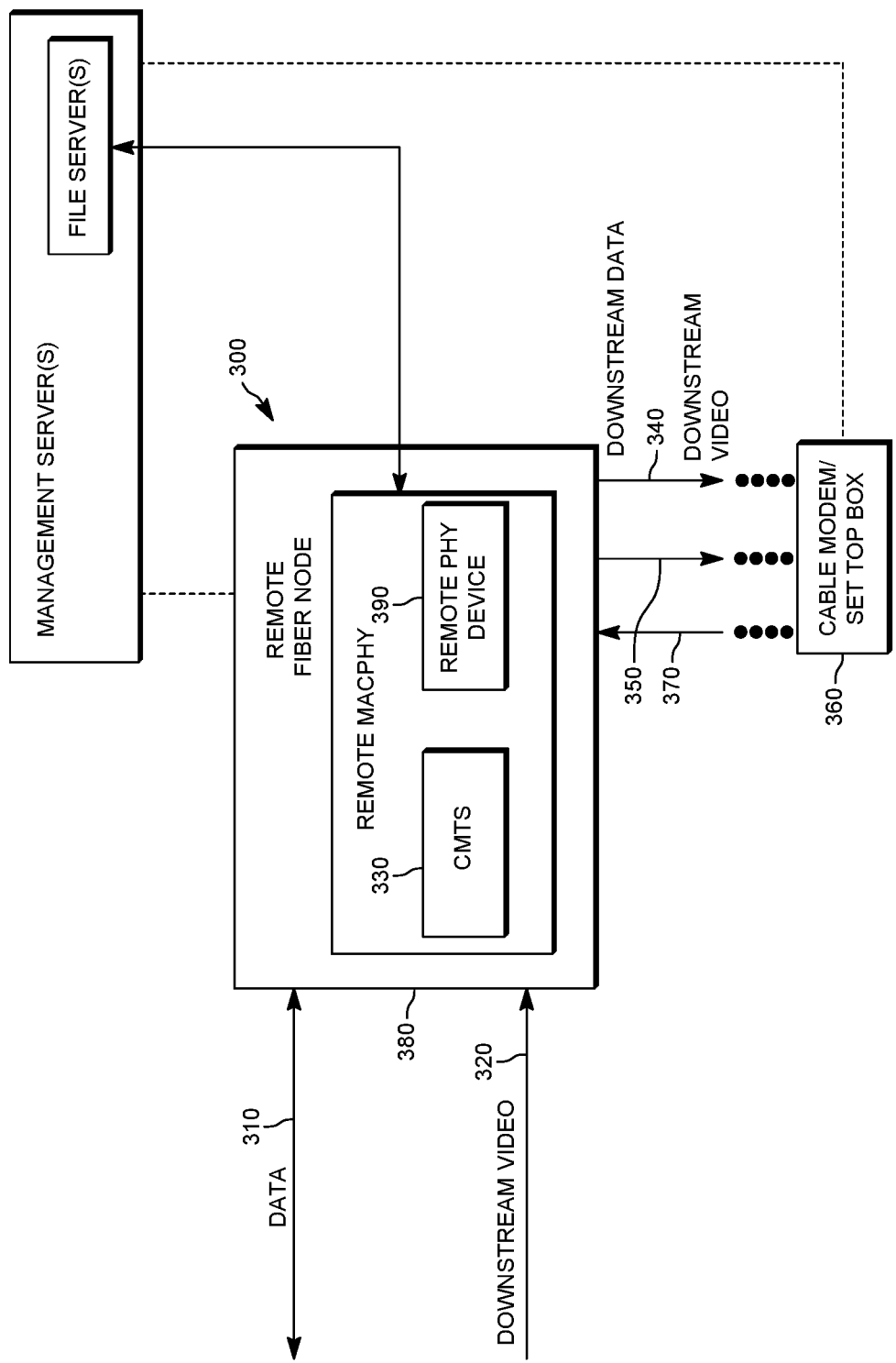
FIG. 6 illustrates another embodiment of a cable modem termination system together with a management server(s).

Referring to FIG. 6, another embodiment includes a remote fiber node 380 for a distributed system 300. The remote fiber node 380 may include a remote MACPHY that includes a CMTS 330 (e.g., core) that includes data 310 that is sent and received over the Internet (or other network) typically in the form of packetized data. The remote fiber node 380 may also receive downstream video 320, typically in the form of packetized data from an operator video aggregation system. The remote fiber node 380 receives and processes the received data 310 and downstream video 320. The remote fiber node 280 preferably includes a remote PHY device 390, where the CMTS 330 and the remote phy device 390 are part of a remote macphy device. The remote PHY device 390 may transmit downstream data 340 and downstream video 350 to a customer's cable modem and/or set top box 360 through a network, which may include other devices, such as amplifier and splitters. The remote PHY device 390 may receive upstream data 370 from a customer's cable modem and/or set top box 360 through a network, which may include other devices, such as amplifiers and splitters. The remote PHY device 390 may include multiple devices to achieve its desired capabilities. The remote PHY device 390 primarily includes PHY related circuitry, such as downstream QAM modulators, upstream QAM demodulators, together with psuedowire logic to connect to the CMTS 330 using network packetized data. The remote PHY device 390 and the CMTS 330 may include data and/or video interconnections, such as downstream data, downstream video, and upstream data. It is noted that, in some embodiments, video traffic may go directly to the remote physical device 390 thereby bypassing the CMTS 330.

To support configuration and control of the different appliances of the cable system, including the R-PHY, the R-MACPHY, the CCAP, the CMTS, routers, switches, cable modems, etc., typically includes a command line interface and/or a graphical user interface. In some cases, one or more of the appliances may be virtualized on a common off the shelf server. The command-line interface (CLI) processes commands for a computer program of the appliance in the form of one or more lines of text. The software program which would be included with the appliance which handles the command line interface is called a command-line interpreter or command-line processor. Operating systems typically implement a command-line interface in a shell for interactive access to operating system functions or services. The graphical user interface is a form of user interface that allows users to interact with the appliance through graphical icons and audio indicator such as primary notation, instead of text-based user interfaces, typed command labels or text navigation. In many cases, the appliance may have a general purpose operating system, such as Linux, Unix, Windows, or otherwise. Often, due to real-time constraints, a real time operating system may be used, such as for example, VxWorks, Deos, etc. Often, the operating system is tuned to efficiently run on the particular appliance.

When each of the appliances are updated, the operator tends to download the software to be installed onto the respective appliance using the command line interface and/or the graphical user interface. The operator then executes or otherwise unpacks the software to be installed on the particular appliance using the command line interface and/or the graphical user interface. This process is repeated each time the software is updated on the appliance, and over time, tends to result in a substantial amount of storage being used to store the outdated downloaded software. When the available storage on the appliance is near full, then during subsequent operation or updating of the software on the appliance, the appliance has a tendency to unexpectedly fail resulting in an unnecessary service outage to customer services by the particular appliance.

Referring to FIG. 3, an appliance of a cable networking system preferably includes a real time operating system (although other types of operating systems may be used) that includes a series of file and/or folder related commands, such as a command to view a list of files and/or folders under the current directory; a command to copy a file and/or directory from one location to another (e.g., #>copy/logs/TodaysLog1 tftp://root:root@10.10.10.2.:69/BulkLogs/TOdaysLog1); a command to create a new file and/or directory; a command to move files and/or directories from one location to another; a command to delete a file and/or directory; a command to execute a file (e.g., #>reload/usr/images/ImageName); a command to view a file. Other file and/or folder commands may be included, such as those that permit traversing the file system. To reduce the likelihood of the operator storing unnecessary files on the local file storage of the appliance, the command-line interpreter and/or command-line processor preferably does not include one or more of such commands above made available to the command line interface. In a similar manner, to reduce the likelihood of the operator storing unnecessary files on the local file storage of the appliance, the graphical user interface preferably does not include one or more of such commands above made available to the graphical user interface.

With such commands no longer available from the CLI and/or GUI, it remains desirable to be able to achieve the functionality of such commands through the command line interface and/or the graphical user interface to traverse the file system and/or execute files. The command line interface and/or the graphical user interface may make use of a remote file system to execute or otherwise update the software on the appliance. This permits the execution of or otherwise updating of the software on the appliance while simultaneously discouraging the operator from excessively storing such files on the system. A command line interface command may include, for example, "copy initializationlog tftp://root:root@10.10.10.2:69/BulkLogs/TodaysInitializationLog1" or "copy debuglog tftp://root:root@10.10.10.2:69/BulkLogs/TodaysdebugLog1". This permits the appliance to log into a remote ftp server with the credential root, and password root, and changes the directory to /BulkLogs/TodaysInitializationLog1 or /BulkLogs/TodaysdebugLog1 and, copy the corresponding file TodaysInitializationLog1 or TodaysdebugLog1. This result in traversing the file system or otherwise file system related commands, by permitting a trivial file transfer protocol (i.e., TFTP) to be used to transfer files, and in this case, from a remote file system. In this manner, the operator will have a tendency to be more deliberate about the transfer and management of files, thereby decreasing the likelihood of excessive files clogging the storage capacity of the appliance. Other file transfer protocols may likewise be used, such as for example, file transfer protocol, secure copy, simple asynchronous file transfer, simple file transfer protocol, hypertext transfer protocol, secure hypertext transfer protocol, etc.

While the entering of such a command is functional, it is often desirable to replace the long sequence of characters with a label, such as RDNAME. For example, RDNAME1 can be set to "tftp://root:root@10.10.10.2:69/BulkLogs/TodaysInitializationLog1" and RDNAME2 can be set to "tftp://root:root@10.10.10.2:69/BulkLogs/TodaysdebugLog1". With this substitution with a label, the commands may be shortened to copy initializationlog RDNAME1 and copy debuglog RDNAME2. Other sequences may be made in a similar manner. Also, the sequence preferably includes the "label" within the central portion of the syntax, rather than, the start of a command syntax. In this manner, the effect is to allow syntaxes to reference an external file system and to constrain the use of the local file system.

By way of example: RMD #exc file [n<protocol>"://" [<user>][:<pwd>]@<server>[":"<port>]"/" <path>"/"<filename>|<rdname>] and RMD #configure ssd-start file <[filepath/]filename>transport <http/https/ tftp>server <(address [IPv6 address ])[":"<port>]>|<rdname>], makes use of an external file system to manage files on the loal system by important and executing.

By way of example: RMD #copy running-config [verbose][full][<protocol>"://"<server>[":"<port>]"/" <path>"/"<filename><rdname>], makes use of an external file system by exporting a file to the external system.

By way of another example, a set of commands may be used to make use of a remote file system for the local file system as illustrated below:

RMD #
RMD #configure remote-drive <rdname>
<protocol>"://"[<user>][:<pwd>]@<server>[":"<port>] "/"<path>"/"<filename>
RMD #configure remote-drive rdname1 https://serial: serial@RemoteSystem:8080/home/serial/cfgfiles/golden
RMD# configure remote-drive rdname2 https://serial: serial@RemoteSystem:8080/home/serial/cfgfiles/current.cfg Examples RMD #exc file rdname1 ofdma48 Mhz.cfg
RMD #exc file rdname1 32×4.cfg
RMD #copy running-config [verbose][full] rdname2

The rdname acts as a user shortcut. In one form, it replaces a normally complex string of characters with a pre-defined label for that string. RDNAME also supports the use case wherein local file system access is not available, and another supporting system or systems are used instead of a local file system. By way of example, it may replace UsersRemoteDirectory or UsersFavoriteScript with a complex string (e.g. protocol>"://"[<user>][:<pwd>]@<server> [":"<port>]"/"<path>) , or, protocol>"://"[<user>][:<pwd>] @<server>[":"<port>]"/"<path>"/"<filename>).

In this example, the complex string represents a path or a file on a server external to the current appliance. When a syntax parsing language encounters one of the rdname instances, it intelligently replaces it with the string. This allows repetitive command line syntaxes to be simpler and more accurately typed. The replacement can be programmed to be more intelligent than simple text replacement. As an example, it can adapt to known protocol (ftp, sftp, tftp, http, https, scp, etc.) syntaxes. In another example of being intelligent, it can format syntaxes for ipv6 vs ipv4 port designations. In yet another example, it can adapt to known security associations (and omit <pwd>when ssh tunnels are detected to be pre-established.

An example syntax might include:
configure remote-drive <rdname><protocol>"://" [<user>][:<pwd>]@<server>[":"<port>]"/"<path>"/"<filename>

In this way, the product configures the appropriate string for each protocol, and adds the optional user, pwd, port, in its' appropriate syntax for each protocol, including IPv4/ IPv6.

Figure 4:
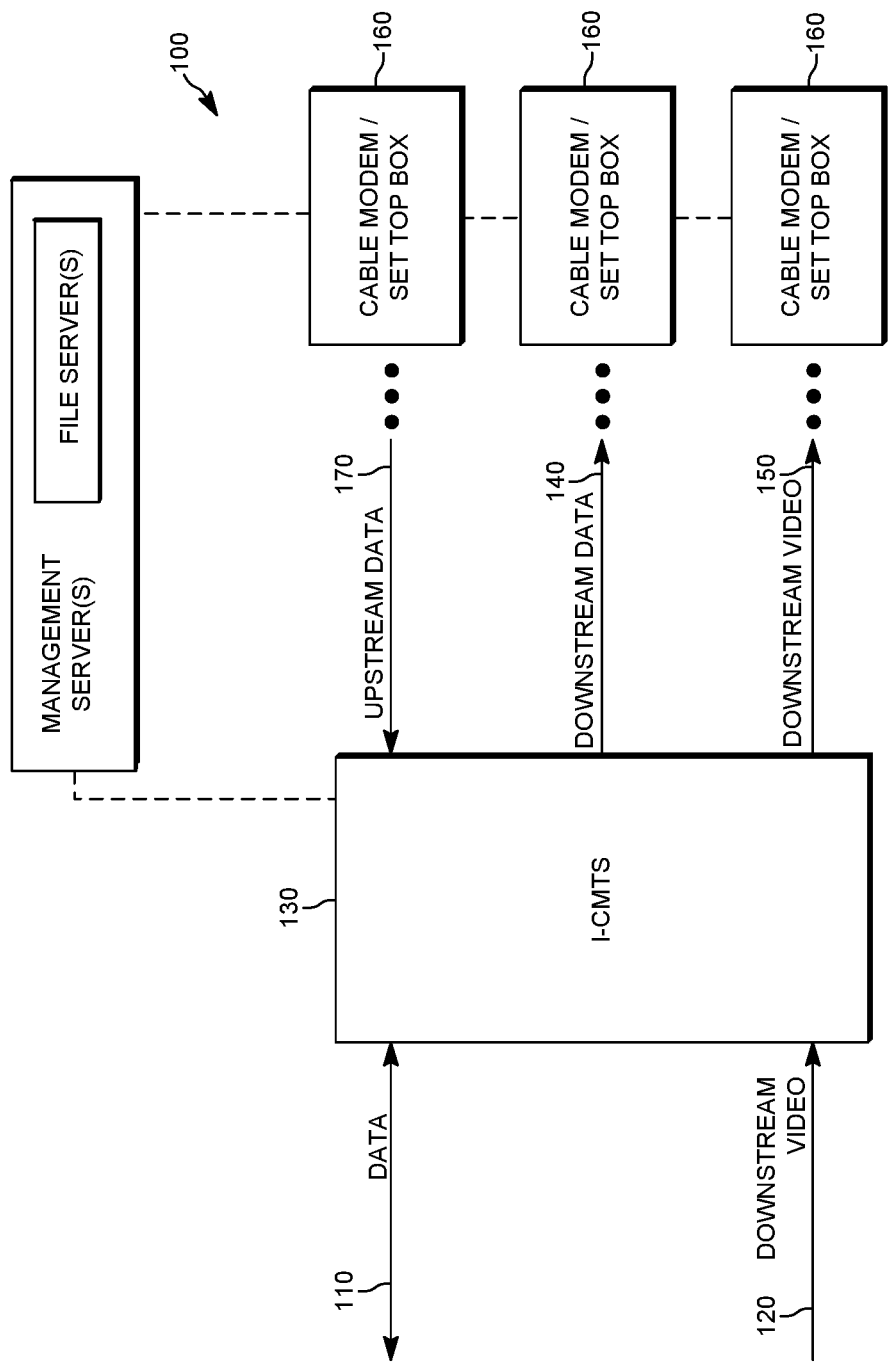
FIG. 4 illustrates an integrated Cable Modem Termination System together with a management server(s).
Figure 5:
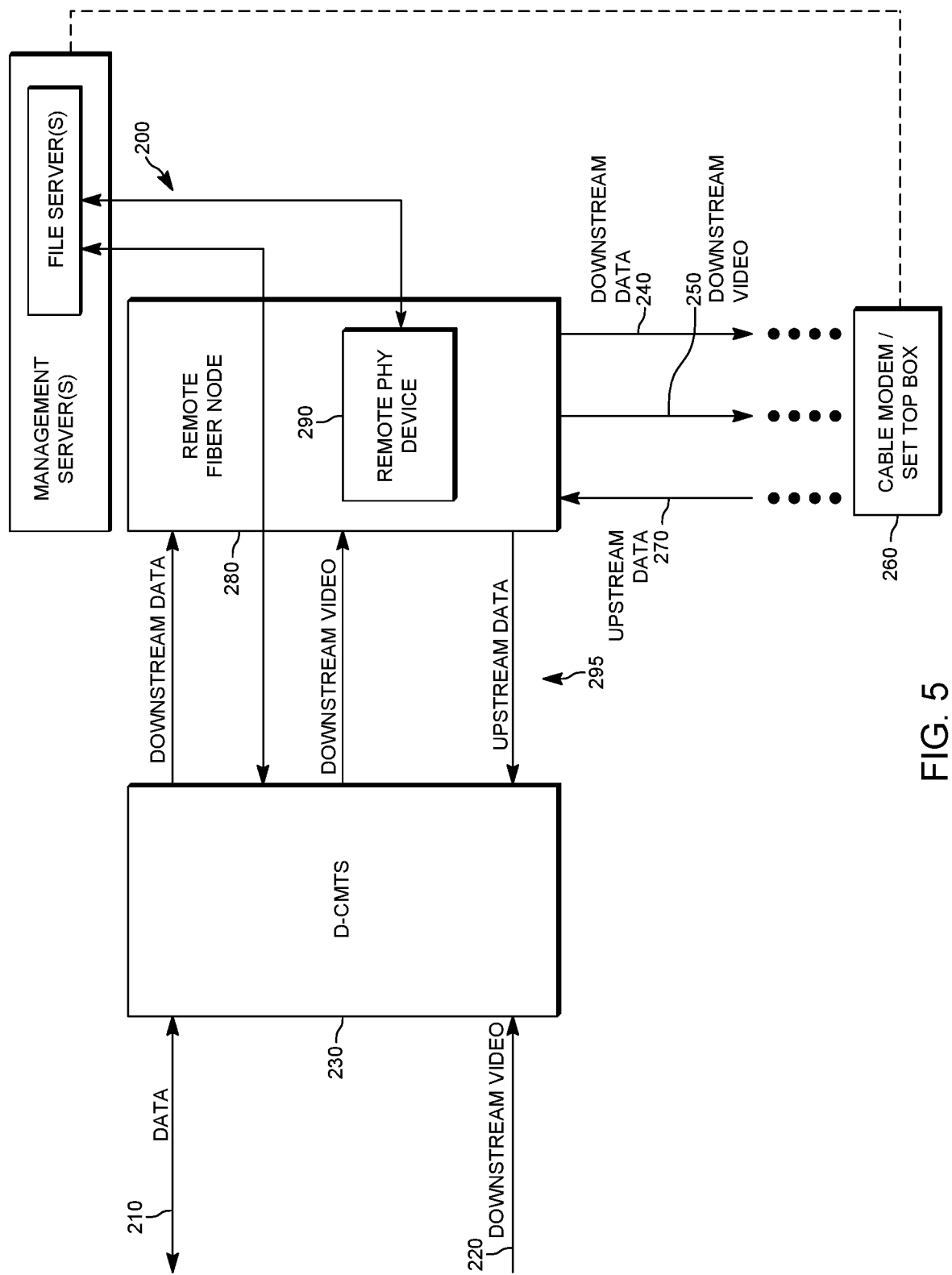
FIG. 5 illustrates a distributed Cable Modem Termination System together with a management server(s).

Referring to FIG. 4 and to FIG. 5, and to FIG. 6, one or more management servers may be included as part of the cable system that may be used to manage each of the appliances, such as RPDs and RMDs. The one or more management servers may include one or more file servers to transfer files between the one or more management servers and a destination device. The one or more management servers may provide access to and execute commands on the appliances making access to a remote file system in a centralized manner, which increases the efficiency and simplifies the management. Also, by way of example, the appliance may execute from a remote file system an initialization file upon starting of an appliance. Also, by way of example, the appliance may execute from a local file system an initialization file upon starting of an appliance. By way of example, the management servers may be divided by the function that each provides, such as for example, a configuration version server, a load server, a script manager, a RMD manager, etc. By way of example, the management servers may be divided by the region that each supperts, such as for example, cities, counties, states, service provider designated regions, etc.

It is noted that the accessing of the remote file system is not mounting the storage as a remote hard drive, since to do so, incurs a substantial amount of operating system overhead and network traffic overhead. It is also noted that the remote file system includes is accessed based upon an Internet Protocol address.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A cable distribution system comprising:
    (a) a head end connected to a plurality of customer devices through a transmission network that includes a remote fiber node that converts received data to analog data suitable to be provided on a coaxial cable for said plurality of customer devices;
    (b) at least one of said head end and said remote fiber node including a command line processor operating on said least one of said head end and said remote fiber node, where said command line processor operating on said least one of said head end and said remote fiber node supports a first set of a plurality of different commands that traverse a local file system on said at least one of said head end and said remote fiber node, said at least one of said head end and said remote fiber node includes an interface selected from at least one of a command line interface and a graphical user interface where said interface receives an input that is processed by said command line processor, where said command line processor supports the execution of said first set of said plurality of different commands, where interface does not support at least one of said first set of said plurality of different commands that are executed by said command line processor that said traverse said local file system, where receiving any commands of said first set by said interface that are not supported by said interface are not executed by said command line processor while receiving any commands of said first set by said interface that are supported by said interface are executed by said command line processor, where said first set of commands includes at least two of,
        (i) view a list of files,
        (ii) view a list of folders,
        (iii) copy a file,
        (iv) copy a directory,
        (v) create new file,
        (vi) create new directory,
        (vii) move a file,
        (viii) move a directory,
        (ix) delete a file,
        (x) delete a directory,
        (xi) execute a file;
        (xii) view a file;
    (c) where said command line processor does not support any commands that result in creating a file that is stored on said remote fiber node made available to said interface;
    (d) where said command line processor does not support a file system that is externally visible to said remote fiber node made available to said interface;
    (e) said at least one of said head end and said remote fiber node configured to access a remote file system based upon a command that includes a label identifying an Internet Protocol address to said remote file system to obtain a file therefrom to said at least one of said head end and said remote fiber node based upon at least one of said at least two of said set of commands.

2. The cable distribution system of claim 1 wherein said remote fiber node includes a remote PHY device.

3. The cable distribution system of claim 1 wherein said remote fiber node includes a remote MAC PHY device.

4. The cable distribution system of claim 1 wherein said head end includes a CMTS.

5. The cable distribution system of claim 1 wherein said command line interpreter includes a command line processor.

6. The cable distribution system of claim 1 wherein said at least one of said head end and said remote fiber node include a real-time operating system.

7. The cable distribution system of claim 1 wherein said file is received by said at least one of said head end and said remote fiber node that updates the software thereon.

8. The cable distribution system of claim 1 wherein said label is positioned mid-phrase of said command.

9. A cable distribution system comprising:
    (a) a remote fiber node, which includes a head end and remote phy device, converts received data to analog data suitable to be provided on a coaxial cable for said plurality of customer devices;
    (b) at least one of said head end and said remote phy device including a command line processor operating on said least one of said head end and said remote phy device, where said command line processor operating on said least one of said head end and said remote phy device supports a first set of a plurality of different commands that traverse a local file system on said at least-one of said head end and said remote phy device, said at least one of said head end and said remote phy device includes an interface selected from at least one of a command line interface and a graphical user interface where said interface receives an input that is processed by said command line processor, where said command line processor supports the execution of said first set of said plurality of different commands, where interface does not support at least one of said first set of said plurality of different commands that are executed by said command line processor that said traverse said local file system, where receiving any commands of said first set by said interface that are not supported by said interface are not executed by said command line processor while receiving any commands of said first set by said interface that are supported by said interface are executed by said command line processor, where said first set of commands includes at least two of,
   (i) view a list of files,
   (ii) view a list of folders,
   (iii) copy a file,
   (iv) copy a directory,
   (v) create new file,
   (vi) create new directory,
   (vii) move a file,
   (viii) move a directory,
   (ix) delete a file,
   (x) delete a directory,
   (xi) execute a file;
   (xii) view a file;
  (c) where said command line processor does not support any commands that result in creating a file that is stored on said remote phy node made available to said interface;
  (d) where said command line processor does not support a file system that is externally visible to said remote phy node made available to said interface;
  (e) said at least one of said head end and said remote phy device configured to access a remote file system based upon a command that includes a label identifying an Internet Protocol address to said remote file system to obtain a file therefrom to said at least one of said head end and said remote phy device based upon at least one of said at least two of said set of commands.

10. The cable distribution system of claim 9 wherein said remote fiber node includes a remote MAC PHY device.

11. The cable distribution system of claim 9 wherein said remote fiber node includes a CMTS.

12. The cable distribution system of claim 9 wherein said command line interpreter includes a command line processor.

13. The cable distribution system of claim 9 wherein said remote fiber node include a real-time operating system.

14. The cable distribution system of claim 9 wherein said file is received by said at least one of said head end and said remote phy device that updates the software thereon.

15. The cable distribution system of claim 9 wherein said label is positioned mid-phrase of said command.

16. A distribution system comprising:
  (a) a remote node that receives data on through a connector and converts the received data to analog data suitable to be provided on a coaxial cable for a plurality of customer devices;
  (b) said remote node including a command line processor operating on said remote node, where said command line processor operating on said remote node supports a first set of a plurality of different commands that traverse a local file system on said remote node, said remote node includes an interface selected from at least one of a command line interface and a graphical user interface where said interface receives an input that is processed by said command line processor, where said command line processor supports the execution of said first set of said plurality of different commands, where interface does not support at least one of said first set of said plurality of different commands that are executed by said command line processor that said traverse said local file system, where receiving any commands of said first set by said interface that are not supported by said interface are not executed by said command line processor while receiving any commands of said first set by said interface that are supported by said interface are executed by said command line processor, where said first set of commands includes at least two of,
   (i) view a list of files,
   (ii) view a list of folders,
   (iii) copy a file,
   (iv) copy a directory,
   (v) create new file,
   (vi) create new directory,
   (vii) move a file,
   (viii) move a directory,
   (ix) delete a file,
   (x) delete a directory,
   (xi) execute a file;
   (xii) view a file;
  (c) where said command line processor does not support any commands that result in creating a file that is stored on said remote node made available to said interface;
  (d) where said command line processor does not support a file system that is externally visible to said remote node made available to said interface;
  (e) said remote node configured to access a remote file system based upon a command that includes a label identifying an Internet Protocol address to said remote file system to obtain a file therefrom to said remote node based upon at least one of said at least two of said set of commands.

* * * * *